April 1, 1930.　　　　A. A. RING　　　　1,752,614
DEVICE FOR HOLDING PRINTED MATTER
Filed Dec. 12, 1927　　2 Sheets-Sheet 1
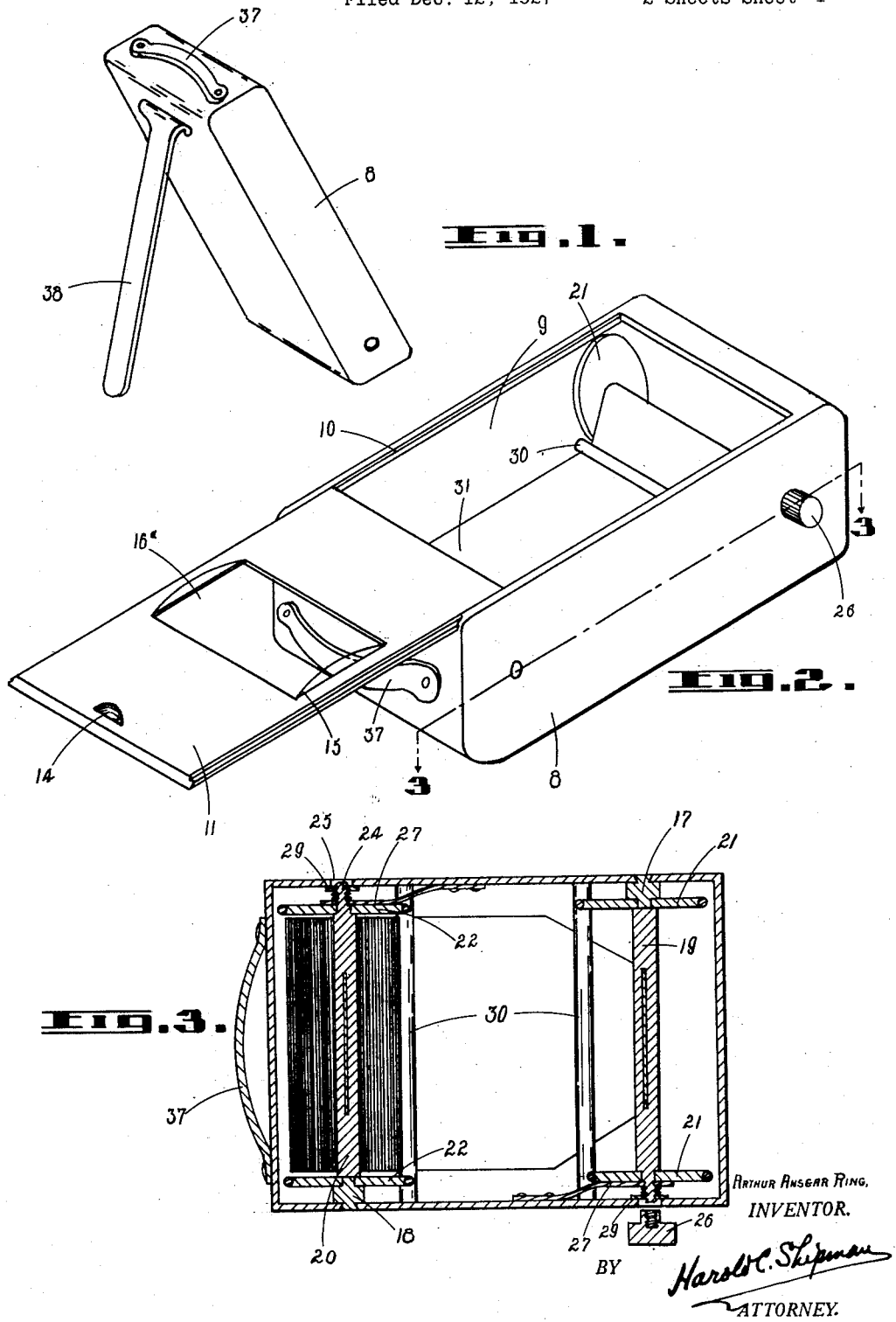

April 1, 1930.    A. A. RING    1,752,614
DEVICE FOR HOLDING PRINTED MATTER
Filed Dec. 12, 1927    2 Sheets-Sheet 2
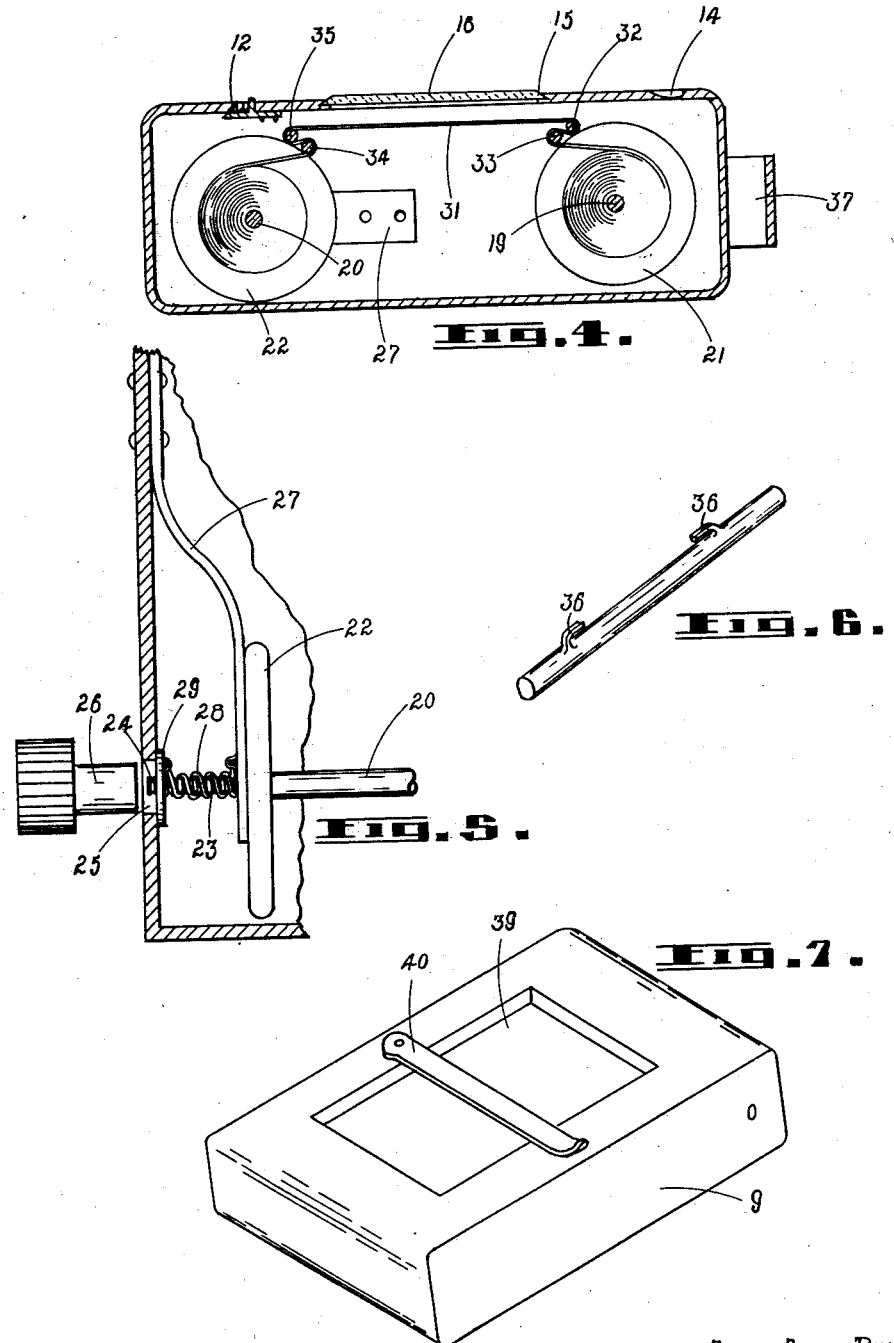
ARTHUR ANSGAR RING,
INVENTOR.
BY *Harold L. Shipman*
ATTORNEY.

Patented Apr. 1, 1930

1,752,614

UNITED STATES PATENT OFFICE

ARTHUR ANSGAR RING, OF MONTREAL, QUEBEC, CANADA

DEVICE FOR HOLDING PRINTED MATTER

Application filed December 12, 1927. Serial No. 239,482.

The invention relates to a device for holding printed matter and particularly to holding a printed strip in proper position relative to a vision plate.

The object of the invention is to provide a simple device over which a strip of printed matter, from a roll, may be properly trained over guide rods, so as to position the same to be read through a vision plate carried in the side of the device.

A further object is to provide a means for removably holding rolls of printed matter in the device. With the foregoing and other objects in view, as will appear as the description proceeds, the invention consists of the novel construction, combination and arrangement of co-operating elements as hereinafter more specifically set forth, claimed and shown in the accompanying drawings forming a part of the present application, in which:

Fig. 1 is a rear perspective view of the preferred embodiment of my invention, looking towards the back.

Fig. 2 is a perspective view of my invention, looking on the top, the cover being shown in open position.

Fig. 3 is a sectional view taken on the line 3—3 of Fig. 2.

Fig. 4 is a longitudinal section view.

Fig. 5 is an enlarged detail view of the retaining means for the spools on which the strips of printed matter are rolled.

Fig. 6 is a perspective view of one of the rods over which the strips of printed matter are trained.

Fig. 7 illustrates a modification of the casing which may be used in connection with my invention.

Like numerals of reference designate corresponding parts throughout the different views.

8 is a casing preferably of rectangular shape and having a rectangular opening in one of its flat faces. 10 are guide grooves along the longitudinal edges of the casing around the opening 9, in which grooves the cover 11 is reciprocally mounted. The cover may be provided with a retainer clamp 12 and a finger indent 14. The cover has a visional opening 15 in which a transparent member 16 or 16ª is retained. For purpose of illustration, I have shown the member 16ª of glass having a convexed upper face to act as a magnifying glass. I do not wish to be limited to any particular material or shape in reference to the glass 16 or 16ª, as various transparent members may be used to obtain the desired result.

At diagonally opposite sides of the casing 8, I provide studs 17 and 18 having inwardly protruding portions on which one end of the spools 19 and 20 respectively are positioned. The spools are provided with annular endplate members 21 and 22. The outer circumference of these members 21 and 22 may be grooved, the purpose of which will be hereinafter mentioned. The operating end of the spool has its axle portion extended as at 23, the end of which is threaded as at 24 and protrudes into the opening 25 in the casing 8. The opening 25 is of sufficient size to permit the inner end of the turning member 26 to fit therein, which turning member 26 is provided with a threaded opening adapted to be threadedly connected over the threaded end 24. 27 is a flat tension spring having one end secured to the inner face of the casing 8. Its free end is provided with an opening through which the axle portion 23 will extend. 28 is a retainer spring having one end secured to the free end of the tension spring 27. The other end of the retaining spring 28 is secured to a closure plate 29 through which the threaded end 24 protrudes. When the turning member 26 is threadedly engaged on the threaded end 24, the closure plate 29 will be forced inwardly against the tension of the retaining spring 28. When the turning member 26 is removed, the retaining spring 28 will return the closure plate 29 to its normal position closing the opening 25. The retaining spring 28 will normally position itself and the closure plate 29 into alignment with the opening in the tension spring 27 and the center of the opening 25, but will permit movement thereof when a spool is being removed and when a new spool is being replaced into position.

30 indicates guide rods having their ends suitably engaged in the side walls of the casing 8. These will be fixed at a pre-determined position so as to properly train the printed strip 31 at a proper distance from the transparent member 16ᵃ. The printed strip 31 will be rolled from one spool to the other by means of operating the turning member 26 when engaged on either of the spools 19 or 20. When the printed strip is rolled up on the spool, elastic bands may be used for retaining the same in rolled position. When the spool is properly positioned in the casing 8, the elastic bands may be positioned in the annular grooves in the outer circumference of the end plates of the spools 19 and 20, and will be conveniently held here until required for again retaining the rolled printed strip on a spool.

Where the flat transparent member 16 is used, it may be desirous of training the printed strip closer to the vision opening. For this purpose, transverse rods 32, 33, 34 and 35 may be used, which rods will have their ends suitably connected to the sides of the casing 8. In Fig. 6, I have shown one of the guide rods having inwardly directed lugs 36 between which the printed strip is threaded so that it will be properly guided in alignment with the vision opening 15.

The casing may be provided with a suitable handle 37, and a back rest 38. If desirous, the back of the casing may be countersunk as at 39 and provided with a transverse spring holder 40. For convenience in selling, the spools, with the printed strips thereon, may be packed in cartons. When a spool is removed from its carton for use in the casing 8, the carton may be folded over and placed in the countersunk portion 39 and will be retained thereby by the member 40 until its spool is removed from the casing.

The foregoing specification and annexed drawings disclose the preferred embodiment of my invention, but it is to be understood that minor changes may be resorted to in the commercial adaptation of my invention without departing from the scope of the invention as hereinafter claimed.

What I claim as new is:

1. A device for displaying a strip of printed matter, comprising a casing having a vission opening therein through which the printed matter on said strip may be viewed; rotatably mounted spools on which said strip is wound; guide rods over which said strip is trained and spurs carried on said rods to properly align said strip in registration relative to said opening.

2. A device for displaying a strip of printed matter, comprising a casing; a vision opening in said casing; a means for reversibly moving said strip in said casing and guide rods with means thereon for aligning said strip in registration relative to said opening.

3. A device for displaying a strip of printed matter, comprising a casing with a vision opening therein; a means for reversibly moving said strip; guide rods, over which said strip is trained, a adapted to retain said strip in taut spaced registration adjacent to said opening and means carried by said rods for keeping said strip in alignment.

In testimony whereof, I affix my signature.
ARTHUR ANSGAR RING.